US012770093B2

(12) United States Patent
Cohen et al.

(10) Patent No.: US 12,770,093 B2
(45) Date of Patent: Oct. 20, 2026

(54) AUGMENTED REALITY PACKAGE DROP POINT SYSTEM

(71) Applicant: Infinitus Holdings Inc., Penn Valley, PA (US)

(72) Inventors: Joshua Ian Cohen, Penn Valley, PA (US); John Cronin, Jericho, VT (US)

(73) Assignee: Infinitus Holdings Inc., Penn Valley, PA (US)

( * ) Notice: Subject to any disclaimer, the term of this patent is extended or adjusted under 35 U.S.C. 154(b) by 101 days.

(21) Appl. No.: 18/886,872

(22) Filed: Sep. 16, 2024

(65) Prior Publication Data

US 2026/0080351 A1 Mar. 19, 2026

(51) Int. Cl.

*G06Q 10/0833* (2023.01)
*G06T 17/05* (2011.01)
*G06T 19/00* (2011.01)

(52) U.S. Cl.

CPC ......... *G06Q 10/0833* (2013.01); *G06T 17/05* (2013.01); *G06T 19/006* (2013.01)

(58) Field of Classification Search

CPC .... G06T 19/006; G06T 17/05; G06Q 10/0833
See application file for complete search history.

(56) References Cited

U.S. PATENT DOCUMENTS

| | | | |
|---|---|---|---|
| 5,539,413 | A | 7/1996 | Farrell et al. |
| 6,047,192 | A | 4/2000 | Maloney et al. |
| 6,307,475 | B1 | 10/2001 | Kelley |
| 6,691,947 | B2 | 2/2004 | La Fata |
| 8,085,199 | B2 | 12/2011 | Grau Besoli et al. |
| 8,421,615 | B2 | 4/2013 | Ryu et al. |
| 8,725,777 | B2 | 5/2014 | Deking et al. |
| 8,989,053 | B1 | 3/2015 | Skaaksrud et al. |
| 9,641,964 | B2 | 5/2017 | Kulkarni et al. |
| 9,739,878 | B2 | 8/2017 | Gudim et al. |

(Continued)

FOREIGN PATENT DOCUMENTS

| | | |
|---|---|---|
| BR | 112019019353 | 4/2020 |
| CA | 3056593 | 9/2018 |

(Continued)

OTHER PUBLICATIONS

U.S. Appl. No. 18/799,909, filed Aug. 8, 2024, US, Joshua Ian Cohen, Graphene-Based Phased Array Antenna for Device Tracking.

(Continued)

*Primary Examiner* — Jin Cheng Wang
(74) *Attorney, Agent, or Firm* — Polsinelli LLP

(57) ABSTRACT

A system is disclosed for identifying a drop point for packages using augmented reality (AR) and/or virtual reality (VR) devices. The system comprises packages with signal-emitting tags, such as RFID tags. The system includes a wireless base station with a phased antenna array and a physical location detection apparatus for 3D mapping. The system further comprises a signal processing module, a location module, and an overlap module which process and convert the detected signals into location data. This data is then transmitted to an AR/VR Device for real-time visualization and interaction. The AR/VR device includes an assist module to assist a package delivery person in delivering the tagged packages to the drop point.

20 Claims, 3 Drawing Sheets

(56) References Cited

U.S. PATENT DOCUMENTS

| | | | |
|---|---|---|---|
| 9,900,742 B1 | 2/2018 | Thoresen et al. | |
| 9,904,509 B1 | 2/2018 | Raffa et al. | |
| 9,936,442 B1 | 4/2018 | Noonan et al. | |
| 9,989,633 B1 | 6/2018 | Pandey et al. | |
| 10,085,118 B1 | 9/2018 | Thoresen et al. | |
| 10,341,814 B2 | 7/2019 | Thoresen et al. | |
| 10,470,675 B2 | 11/2019 | Zhang et al. | |
| 10,587,987 B2 | 3/2020 | Thoresen et al. | |
| 10,721,590 B2 | 7/2020 | Thoresen et al. | |
| 10,969,486 B2 | 4/2021 | Thoresen et al. | |
| 11,455,411 B2 | 9/2022 | Alameh et al. | |
| 11,573,317 B2 | 2/2023 | Thoresen et al. | |
| 11,861,546 B1 * | 1/2024 | Wang | G06Q 10/0832 |
| 12,159,256 B1 * | 12/2024 | Zeng | G06T 19/006 |
| 12,198,698 B1 | 1/2025 | Benster et al. | |
| 12,412,465 B1 | 9/2025 | Daoura et al. | |
| 12,442,915 B1 | 10/2025 | Cohen et al. | |
| 12,498,447 B1 | 12/2025 | Wichgers | |
| 2002/0008657 A1 | 1/2002 | Poore | |
| 2002/0019829 A1 | 2/2002 | Shapiro | |
| 2002/0111173 A1 | 8/2002 | Hendrey et al. | |
| 2002/0164995 A1 | 11/2002 | Brown et al. | |
| 2002/0183072 A1 | 12/2002 | Steinbach et al. | |
| 2003/0003933 A1 | 1/2003 | Deshpande et al. | |
| 2003/0020623 A1 | 1/2003 | Cao et al. | |
| 2003/0048224 A1 | 3/2003 | Benner et al. | |
| 2003/0054813 A1 | 3/2003 | Riley et al. | |
| 2003/0083046 A1 | 5/2003 | Mathis | |
| 2003/0096621 A1 | 5/2003 | Jana et al. | |
| 2003/0096628 A1 | 5/2003 | Bar-On et al. | |
| 2003/0100326 A1 | 5/2003 | Grube et al. | |
| 2003/0186716 A1 | 10/2003 | Dorenbosch et al. | |
| 2004/0111184 A1 | 6/2004 | Chiappetta et al. | |
| 2004/0235568 A1 | 11/2004 | Kim | |
| 2005/0020279 A1 | 1/2005 | Markhovsky et al. | |
| 2005/0113123 A1 | 5/2005 | Torvinen | |
| 2005/0149443 A1 | 7/2005 | Torvinen | |
| 2005/0210104 A1 | 9/2005 | Torvinen | |
| 2005/0221812 A9 | 10/2005 | Gailey et al. | |
| 2005/0233776 A1 | 10/2005 | Allen et al. | |
| 2007/0081503 A1 | 4/2007 | Mower | |
| 2007/0127634 A1 | 6/2007 | Katsumi | |
| 2008/0062049 A1 | 3/2008 | Soler Castany et al. | |
| 2009/0167787 A1 | 7/2009 | Bathiche et al. | |
| 2009/0201850 A1 | 8/2009 | Davis et al. | |
| 2010/0134254 A1 | 6/2010 | Kim | |
| 2010/0287485 A1 | 11/2010 | Bertolami et al. | |
| 2011/0125063 A1 | 5/2011 | Shalon et al. | |
| 2011/0183683 A1 | 7/2011 | Das et al. | |
| 2011/0257812 A1 | 10/2011 | Carpenter et al. | |
| 2011/0273321 A1 | 11/2011 | Joshi et al. | |
| 2012/0307645 A1 | 12/2012 | Grosman et al. | |
| 2013/0044128 A1 | 2/2013 | Liu et al. | |
| 2013/0099898 A1 | 4/2013 | Bloy | |
| 2013/0142384 A1 | 6/2013 | Ofek | |
| 2013/0222371 A1 | 8/2013 | Reitan | |
| 2013/0231130 A1 | 9/2013 | Cherian et al. | |
| 2013/0278464 A1 | 10/2013 | Xia et al. | |
| 2013/0342564 A1 | 12/2013 | Kinnebrew et al. | |
| 2014/0018059 A1 | 1/2014 | Noonan | |
| 2014/0231499 A1 | 8/2014 | Simmons, Jr. | |
| 2014/0266619 A1 | 9/2014 | Ali et al. | |
| 2014/0285375 A1 | 9/2014 | Crain | |
| 2015/0062558 A1 | 3/2015 | Koppal et al. | |
| 2015/0116144 A1 | 4/2015 | Olmedo et al. | |
| 2015/0147067 A1 | 5/2015 | Ryan et al. | |
| 2015/0221135 A1 | 8/2015 | Hill et al. | |
| 2015/0241959 A1 | 8/2015 | Abovitz et al. | |
| 2015/0287422 A1 | 10/2015 | Short et al. | |
| 2015/0302665 A1 | 10/2015 | Miller | |
| 2015/0319568 A1 | 11/2015 | Haro et al. | |
| 2015/0319687 A1 | 11/2015 | Farley et al. | |
| 2015/0334768 A1 | 11/2015 | Ranasinghe et al. | |
| 2015/0348538 A1 | 12/2015 | Donaldson | |
| 2015/0356782 A1 | 12/2015 | Miller et al. | |
| 2015/0382148 A1 | 12/2015 | Agarwal et al. | |
| 2016/0050525 A1 | 2/2016 | Droll et al. | |
| 2016/0117688 A1 | 4/2016 | Ghosh et al. | |
| 2016/0161607 A1 | 6/2016 | Turner et al. | |
| 2016/0189416 A1 | 6/2016 | Naguib et al. | |
| 2016/0292744 A1 | 10/2016 | Strimaitis et al. | |
| 2017/0006430 A1 | 1/2017 | Chao et al. | |
| 2017/0026805 A1 | 1/2017 | Smith et al. | |
| 2017/0089739 A1 | 3/2017 | Gallo et al. | |
| 2017/0188066 A1 | 6/2017 | Gaidar et al. | |
| 2017/0238136 A1 | 8/2017 | Smith | |
| 2017/0251400 A1 | 8/2017 | Jha et al. | |
| 2017/0301200 A1 | 10/2017 | Siminoff | |
| 2017/0336220 A1 | 11/2017 | Broaddus et al. | |
| 2017/0337813 A1 | 11/2017 | Taylor | |
| 2018/0091940 A1 | 3/2018 | Gonzalez et al. | |
| 2018/0123257 A1 | 5/2018 | Henry et al. | |
| 2018/0172824 A1 | 6/2018 | Beckett et al. | |
| 2018/0173494 A1 | 6/2018 | Choi et al. | |
| 2018/0253681 A1 | 9/2018 | Stiefel et al. | |
| 2018/0270608 A1 | 9/2018 | Thoresen et al. | |
| 2018/0270612 A1 | 9/2018 | Thoresen et al. | |
| 2018/0365898 A1 | 12/2018 | Costa | |
| 2019/0034673 A1 | 1/2019 | Koch et al. | |
| 2019/0043259 A1 | 2/2019 | Wang et al. | |
| 2019/0079176 A1 | 3/2019 | Weissman | |
| 2019/0132685 A1 | 5/2019 | Skoglund et al. | |
| 2019/0173156 A1 | 6/2019 | Hu | |
| 2019/0182627 A1 | 6/2019 | Thoresen et al. | |
| 2019/0195998 A1 | 6/2019 | Campbell | |
| 2020/0025911 A1 | 1/2020 | Rappaport | |
| 2020/0074386 A1 | 3/2020 | Mossoba et al. | |
| 2020/0074743 A1 | 3/2020 | Zheng et al. | |
| 2020/0118290 A1 | 4/2020 | Liu et al. | |
| 2020/0137516 A1 | 4/2020 | Thoresen et al. | |
| 2020/0200892 A1 | 6/2020 | Rajab et al. | |
| 2020/0201513 A1 | 6/2020 | Malmed et al. | |
| 2020/0204375 A1 | 6/2020 | Coulmeau et al. | |
| 2020/0279279 A1 | 9/2020 | Chaudhuri | |
| 2020/0309944 A1 | 10/2020 | Thoresen et al. | |
| 2020/0372442 A1 | 11/2020 | Tennill et al. | |
| 2021/0104154 A1 | 4/2021 | Yokoyama et al. | |
| 2021/0142055 A1 | 5/2021 | Broggi | |
| 2021/0215818 A1 | 7/2021 | Kim et al. | |
| 2021/0223389 A1 | 7/2021 | Ikefuji et al. | |
| 2021/0271949 A1 | 9/2021 | Forster | |
| 2021/0318428 A1 | 10/2021 | Thoresen et al. | |
| 2021/0374485 A1 | 12/2021 | Pilcher et al. | |
| 2021/0391917 A1 | 12/2021 | Morozs et al. | |
| 2021/0405182 A1 | 12/2021 | Reynolds et al. | |
| 2022/0044681 A1 | 2/2022 | Agarwal | |
| 2022/0078578 A1 | 3/2022 | Brumley et al. | |
| 2022/0084066 A1 | 3/2022 | Kisko et al. | |
| 2022/0091259 A1 | 3/2022 | Hucks et al. | |
| 2022/0094036 A1 | 3/2022 | Yong et al. | |
| 2022/0107387 A1 | 4/2022 | Chayat et al. | |
| 2022/0196782 A1 | 6/2022 | Dawar et al. | |
| 2022/0256310 A1 | 8/2022 | Volkerink et al. | |
| 2022/0284883 A1 | 9/2022 | Buchter et al. | |
| 2022/0311112 A1 | 9/2022 | Wang et al. | |
| 2022/0375477 A1 | 11/2022 | Tan et al. | |
| 2023/0056831 A1 | 2/2023 | Manolakos et al. | |
| 2023/0128484 A1 | 4/2023 | Turbiner et al. | |
| 2023/0189024 A1 | 6/2023 | Tran et al. | |
| 2023/0258763 A1 | 8/2023 | Donderici | |
| 2023/0259798 A1 | 8/2023 | Modugula et al. | |
| 2023/0290342 A1 | 9/2023 | Kim et al. | |
| 2023/0298462 A1 | 9/2023 | Witt | |
| 2023/0319699 A1 | 10/2023 | Kiss et al. | |
| 2023/0334850 A1 | 10/2023 | Harvey et al. | |
| 2023/0353450 A1 | 11/2023 | Wang | |
| 2023/0360389 A1 | 11/2023 | Tiballi | |
| 2023/0408627 A1 | 12/2023 | Bao et al. | |
| 2024/0022565 A1 | 1/2024 | Keith, Jr. | |
| 2024/0188109 A1 | 6/2024 | Bao et al. | |
| 2024/0204878 A1 | 6/2024 | Howe et al. | |
| 2024/0214452 A1 * | 6/2024 | Skaaksrud | A47G 29/1214 |
| 2024/0220543 A1 | 7/2024 | Blake et al. | |
| 2025/0094380 A1 | 3/2025 | Mazed | |

(56) References Cited

U.S. PATENT DOCUMENTS

| | | | |
|---|---|---|---|
| 2025/0111845 A1 | 4/2025 | Thiruchengode Vajravel et al. | |
| 2025/0142289 A1 | 5/2025 | Seo et al. | |
| 2025/0180369 A1* | 6/2025 | Gurgul | G01C 21/36 |
| 2025/0190723 A1 | 6/2025 | Reddy et al. | |
| 2025/0299157 A1 | 9/2025 | Hiscock et al. | |
| 2025/0349040 A1 | 11/2025 | Aberman et al. | |
| 2025/0392884 A1 | 12/2025 | Austin et al. | |
| 2026/0039016 A1 | 2/2026 | Duron et al. | |
| 2026/0050078 A1 | 2/2026 | Cohen et al. | |
| 2026/0052450 A1 | 2/2026 | Cohen et al. | |
| 2026/0056703 A1 | 2/2026 | Ramasamy et al. | |
| 2026/0073426 A1 | 3/2026 | Cohen et al. | |
| 2026/0073639 A1 | 3/2026 | Cohen et al. | |
| 2026/0073925 A1 | 3/2026 | Cohen et al. | |
| 2026/0080896 A1 | 3/2026 | Cohen et al. | |
| 2026/0086228 A1 | 3/2026 | Cohen et al. | |
| 2026/0086229 A1 | 3/2026 | Cohen et al. | |
| 2026/0087522 A1 | 3/2026 | Cohen et al. | |
| 2026/0181575 A1 | 6/2026 | Cohen et al. | |
| 2026/0243886 A1 | 8/2026 | Cohen et al. | |

FOREIGN PATENT DOCUMENTS

| | | | |
|---|---|---|---|
| CN | 102473266 | A | 5/2012 |
| CN | 103166691 | A | 6/2013 |
| CN | 104380279 | A | 2/2015 |
| CN | 104569964 | | 4/2015 |
| CN | 110390944 | A | 10/2019 |
| CN | 110637480 | | 12/2019 |
| CN | 112788288 | A | 5/2021 |
| CN | 213818098 | U | 7/2021 |
| CN | 114487804 | A | 5/2022 |
| CN | 115622626 | A | 1/2023 |
| CN | 116959455 | A | 10/2023 |
| EP | 3596977 | | 1/2020 |
| IL | 269372 | A | 11/2019 |
| JP | 2017-067624 | | 4/2017 |
| JP | 2020-515205 | | 5/2020 |
| WO | WO 2012/082155 | A2 | 6/2012 |
| WO | WO 2016/109455 | | 7/2016 |
| WO | WO 2018/169558 | | 9/2018 |
| WO | WO 2019/089201 | | 5/2019 |
| WO | WO 2019/113418 | | 6/2019 |
| WO | WO 2019/210284 | | 10/2019 |
| WO | 2024045166 | A1 | 3/2024 |
| WO | 2026036114 | A1 | 2/2026 |
| WO | WO 2026/043820 | A2 | 2/2026 |
| WO | WO 2026/043822 | A1 | 2/2026 |
| WO | WO 2026/050412 | A1 | 3/2026 |
| WO | WO 2026/055553 | A1 | 3/2026 |
| WO | WO 2026/055555 | A1 | 3/2026 |
| WO | WO 2026/055556 | A1 | 3/2026 |
| WO | WO 2026/060404 | A1 | 3/2026 |
| WO | WO 2026/064678 | A1 | 3/2026 |
| WO | WO 2026/064706 | A1 | 3/2026 |
| WO | WO 2026/072596 | A2 | 4/2026 |
| WO | WO 2026/073038 | A1 | 4/2026 |

OTHER PUBLICATIONS

U.S. Appl. No. 18/808,382, filed Aug. 19, 2024, US, Joshua Ian Cohen, Hybrid Phased Antenna Array for Device Tracking.
U.S. Appl. No. 18/808,970, filed Aug. 19, 2024, US, Joshua Ian Cohen, Metamaterial Asset Tags for Device Tracking in a 3D Space.
U.S. Appl. No. 18/827,531, filed Sep. 6, 2024, US, Joshua Ian Cohen, Voice Identification via Radio Wave Demodulation.
U.S. Appl. No. 18/817,639, filed Aug. 28, 2024, US, Joshua Ian Cohen, Method and System for Determining Device Orientation Within Augmented Reality Applications.
U.S. Appl. No. 18/826,822, filed Sep. 6, 2024, US, Joshua Ian Cohen, Systems and Methods for Marker Placement in Augmented Reality.
U.S. Appl. No. 18/826,846, filed Sep. 6, 2024, US, Joshua Ian Cohen, Camera-Integrated Wireless 3D Mapping and Tracking System.
U.S. Appl. No. 18/891,448, filed Sep. 20, 2024, US, Joshua Ian Cohen, Dynamic User-Tracking Digital Signage Sstem and Method.
U.S. Appl. No. 18/890,430, filed Sep. 19, 2024, US, Joshua Ian Cohen, Wireless Device Fingerprinting Systems and Methods.
U.S. Appl. No. 18/897,590, filed Sep. 26, 2024, US, Joshua Ian Cohen, High-Edge Antennas for Optimized SAR Performance.
U.S. Appl. No. 18/895,234, filed Sep. 24, 2024, US, Joshua Ian Cohen, Wireless Base Station Deployment for Target Mapping.
Chen et al., "THz Beamforming Using Graphene-Based Devices," Mar. 28, 2013, Retrieved from online Oct. 10, 2025, Retrieved from URL: https://ieeexplore.ieee.org/abstract/document/6486639.
Wang et al., "UWHear: Through-wall Extraction and Separation of Audio Vibrations Using Wireless Signals," Sensys '20: Proceedings of the 18th Conference on Embedded Networked Sensor Systems, Nov. 16, 2020, 14 pages. Retrieved on Nov. 3, 2025, URL: https://doi.org/10.1145/3384419.3430772.
U.S. Appl. No. 18/891,448, Office Action dated Aug. 27, 2025.
PCT Application No. PCT/US2025/041389, International Search Report and Written Opinion dated Oct. 20, 2025.
PCT Application No. PCT/US2025/042470, International Search Report and Written Opinion dated Nov. 4, 2025.
PCT Application No. PCT/US2025/045237, International Search Report and Written Opinion dated Nov. 20, 2025.
PCT Application No. PCT/US2025/043788, International Search Report and Written Opinion dated Oct. 21, 2025.
PCT Application No. PCT/US2025/045239, International Search Report and Written Opinion dated Nov. 20, 2025.
PCT Application No. PCT/US2025/045240, International Search Report and Written Opinion dated Nov. 25, 2025.
PCT Application No. PCT/US2025/046455, International Search Report and Written Opinion dated Jan. 9, 2026.
PCT Application No. PCT/US2025/047341, International Search Report and Written Opinion dated Nov. 18, 2025.
PCT Application No. PCT/US2025/047258, International Search Report and Written Opinion dated Dec. 3, 2025.
PCT Application No. PCT/US2025/048302, International Search Report and Written Opinion dated Dec. 11, 2025.
PCT/US25/41389, WO, Joshua Ian Cohen, Graphene-Based Phased Array Antenna for Device Tracking, Aug. 8, 2025.
PCT/US25/42467, WO, Joshua Ian Cohen, Hybrid Phased Antenna Array for Device Tracking, Aug. 18, 2025.
PCT/US25/42470, WO, Joshua Ian Cohen, Metamaterial Asset Tags for Device Tracking in a 3D Space, Aug. 18, 2025.
PCT/US25/45237, WO, Joshua Ian Cohen, Voice Identification via Radio Wave Demodulation, Sep. 5, 2025.
PCT/US25/43788, WO, Joshua Ian Cohen, Method and System for Determining Device Orientation Within Augmented Reality Applications, Aug. 27, 2025.
PCT/US25/45239, WO, Joshua Ian Cohen, Systems and Methods for Marker Placement in Augmented Reality, Sep. 5, 2025.
PCT/US25/45240, WO, Joshua Ian Cohen, Camera-Integrated Wireless 3D Mapping and Tracking System, Sep. 5, 2025.
PCT/US25/41389, WO, Joshua Ian Cohen, Augmented Reality Package Drop Point System, Sep. 15, 2025.
PCT/US25/47341, WO, Joshua Ian Cohen, Dynamic User-Tracking Digital Signage System and Method, Sep. 22, 2025.
PCT/US25/47258, WO, Joshua Ian Cohen, Wireless Device Fingerprinting Systems and Methods, Sep. 19, 2025.
PCT/US25/48302, WO, Joshua Ian Cohen, High-Edge Antennas for Optimized SAR Performance, Sep. 26, 2025.
PCT/US25/47602, WO, Joshua Ian Cohen, Wireless Base Station Deployment for Target Mapping, Sep. 23, 2025.
Barbera et al., "Signals from the crowd: uncovering social relationships through smartphone probes," Proceedings of the 2013 Conference on Internet Measurement Conference, IMC '13, Jan. 1, 2013, pp. 265-276.
Pang et al., "802.11 user fingerprinting," Proceedings of the 13th Annual ACM International Conference on Mobile Computing and Networking, ACM, Montreal, Quebec, Canada, Sep. 9, 2007, pp. 99-110.

(56) References Cited

OTHER PUBLICATIONS

Scheuner et al., "Probr—A Generic and Passive WiFi Tracking System" 2016 IEEE 41st Conference on Local Computer Networks.
EP Application No. 2017901233.7, Extended European Search Report dated Jul. 31, 2020.
Israeli Application No. 269372, Office Action dated Jul. 27, 2021.
Mexican Application No. MX/a/2019/010955, Second Office Action dated Jun. 27, 2022.
Mexican Application No. MX/a/2019/010955, First Office Action dated Jan. 12, 2022.
PCT Application No. PCT/US2018/064420, International Search Report and Written Opinion dated Mar. 1, 2019.
PCT Application No. PCT/US2018/064420, International Preliminary Report on Patentability dated Jun. 18, 2020.
PCT Application No. PCT/US2017/033428, International Search Report and Written Opinion dated Aug. 1, 2017.
PCT Application No. PCT/US2017/033428, International Preliminary Report on Patentability dated Sep. 26, 2019.
PCT Application No. PCT/US2018/055157, International Search Report and Written Opinion dated Dec. 20, 2018.
PCT Application No. PCT/US2018/055157, International Preliminary Report on Patentability dated May 14, 2020.
PCT Application No. PCT/US2019/029507, International Search Report and Written Opinion dated Jul. 2, 2019.
PCT Application No. PCT/US2019/029507, International Preliminary Report on Patentability dated Nov. 5, 2020.
U.S. Appl. No. 15/802,399, Office Action dated Aug. 30, 2018.
U.S. Appl. No. 16/437,299, Office Action dated Feb. 5, 2020.
U.S. Appl. No. 17/222,928, Office Action dated Sep. 29, 2022.
Park et al., "Autoencoder-based signal modulation and demodulation methods for sonobuoy signal transmission and reception," Sensors, vol. 22, No. 6510, Aug. 29, 2022, 15 pages.
U.S. Appl. No. 18/827,531, Office Action dated Apr. 22, 2026.
U.S. Appl. No. 18/826,822, Office Action dated Mar. 18, 2026.
U.S. Appl. No. 18/891,448, Final Office Action dated Mar. 2, 2026.
Apple: "iPhone 14 Pro—Technical Specifications," 2022, Downloaded on May 29, 2026. URL: https://support.apple.com/en-US/111850, 17 pages.
Huang, B. et al., "Cloud removal from optical satellite imagery with SAR imagery using sparse representation," IEEE Geoscience and Remote Sensing Letters, 12.5 (2015): 1046-1050. (Year: 2015).
Pourshamsi, M. et al., "A machine-learning approach to PollnSAR and LiDAR data for improved tropical forest canopy height estimation using NASA AfriSAR Campaign data," IEEE Journal of Selected Topics in Applied Earth Observations and Remote Sensing, 11.10 (2018): 3453-3463. (Year: 2018).
Rowland, S. L., "Understanding Our Digital Fingerprints: Metadata, Competency, and the Future Practice of Law," University of St. Thomas Law Journal, vol. 20, No. 1, pp. 276-294 Jan. 2024.
Sandberg, M., "Land cover mapping with multi-temporal SAR and optical satellite data," (2016) (Year: 2016).
Ying, Z., "Antennas in Cellular Phones for Mobile Communications," Proceedings of the IEEE, vol. 100, No. 7, Mar. 16, 2012, 11 pages.
U.S. Appl. No. 18/799,909, Office Action dated Jun. 30, 2026.
U.S. Appl. No. 19/355,976, Office Action dated Jun. 2, 2026.
U.S. Appl. No. 18/826,846, Office Action dated May 28, 2026.
U.S. Appl. No. 18/891,448, Office Action dated Jun. 12, 2026.
U.S. Appl. No. 18/890,430, Office Action dated Jun. 3, 2026.
U.S. Appl. No. 18/897,590, Office Action dated Jul. 28, 2026.

* cited by examiner

AUGMENTED REALITY PACKAGE DROP POINT SYSTEM

FIELD OF THE DISCLOSURE

The present disclosure is generally related to systems and methods of 3D mapping using a phased array.

BACKGROUND

Package delivery workers often struggle to accurately identify designated drop points, leading to misplaced or undelivered packages and increased customer dissatisfaction. In high-density residential or commercial areas, it is common for packages to be delivered to incorrect addresses or locations, causing confusion and inconvenience for both couriers and recipients. Ensuring that packages are delivered to secure and designated areas is a significant challenge, especially in areas with high foot traffic or where traditional drop-off points are not clearly marked.

SUMMARY

The present disclosure solves the problems of conventional approaches by providing an augmented reality package drop point system. According to one aspect, a system includes at least one signal-emitting tag attachable to one or more packages to be delivered, as well as a visualization device to assist with delivering the one or more packages. The system also includes a wireless base station including a communication interface configured to receive drop point data for the one or more packages. The system further includes a phased antenna array configured to receive signals from the at least one signal-emitting tag and the visualization device. The system additionally includes a signal processing module configured to process the received signals to locate the at least one signal-emitting tag and the visualization device relative to the wireless base station in three-dimensional (3D) space within an environment and generate therefrom location data. Further, the system includes a physical location detection apparatus configured to generate 3D map data of the environment. Additionally, the system includes an overlap module configured to combine the location data and the 3D map data. The system also includes a location module configured to calculate drop point locations relative to the visualization device within the environment from the drop point data, add the drop point locations to the combined location data and the 3D map data, and transform the combined location data, 3D map data, and drop point locations such that the visualization device is at an origin of a coordinate system in the 3D space. The communication interface is further configured to transmit the transformed combined tracking data, 3D map data, and drop point locations to the visualization device for real-time visualization and interaction therewith.

In some embodiments, the visualization device is at least one of an augmented reality (AR) device and/or a virtual reality (VR) device, such as an AR/VR headset and/or a mobile device (e.g., tablet or cell phone).

In some embodiments, the at least one signal-emitting tag include one or more of radio frequency identification (RFID) tags, near field communication (NFC) tags, Wi-Fi tags, global position system (GPS) tags, and/or long range (LoRa) tags.

In some embodiments, the signal processing module is configured to locate the at least one signal-emitting tag and the visualization device using at least one of an Angle of Arrival (AoA) measurement, a Kalman filter, a Joint Probabilistic Data Association (JPDA) operation, and/or a Multiple Signal Classification (MUSIC) algorithm.

In some embodiments, the signal processing module determines a location of the at least one signal-emitting tag and the visualization device by triangulation and/or trilateration.

In some embodiments, the physical location detection apparatus includes one or more of Synthetic Aperture Radar (SAR), stereo cameras, Time-of-Flight (ToF) cameras, structured light cameras, and/or LIDAR systems to generate the 3D map data.

In some embodiments, the drop point data includes geolocation data and/or data that indicates location based a fixed signal source that the wireless base station can detect via the phased antenna array.

In some embodiments, the overlap module is configured to calculate an offset between an origin of signal data received by the phased antenna array and an origin of the 3D map data.

In some embodiments, the visualization device includes an assist module configured to identify a current delivery, display markers for tagged packages within a visualization provided by the visualization device, display a marker for at least one drop point in the drop point data, and use the 3D map data to generate a path to the at least one drop point in the visualization.

In some embodiments, the assist module is configured to wait for each of a plurality of tagged packages to be at the at least one drop point and display a delivery completion indication when each of the plurality of tagged packages is delivered.

According to another aspect, a method includes attaching at least one signal-emitting tag to one or more packages to be delivered and receiving drop point data for the one or more packages. The method also includes receiving, via a phased antenna array, signals from the at least one signal-emitting tag and a visualization device. The method further includes processing the received signals via a signal processor to locate the at least one signal-emitting tag and the visualization device relative to the phased antenna array in three-dimensional (3D) space within an environment and generate therefrom location data. In addition, the method includes generating 3D map data of the environment using a physical location detection apparatus. Further, the method includes combining the location data and the 3D map data. The method additionally includes calculating drop point locations relative to the visualization device within the environment from the drop point data. The method also includes adding the drop point locations to the combined location data and the 3D map data. Further, the method includes transforming the combined location data, 3D map data, and drop point locations such that the visualization device is at an origin of a coordinate system in the 3D space. In addition, the method includes transmitting the transformed combined tracking data, 3D map data, and drop point locations to the visualization device for real-time visualization and interaction therewith.

In some embodiments, the visualization device is at least one of an augmented reality (AR) device and/or a virtual reality (VR) device.

In some embodiments, the at least one signal-emitting tag include one or more of radio frequency identification (RFID) tags, near field communication (NFC) tags, Wi-Fi tags, global position system (GPS) tags, and/or long range (LoRa) tags.

In some embodiments, processing includes locating the at least one signal-emitting tag and the visualization device using at least one of an Angle of Arrival (AoA) measurement, a Kalman filter, a Joint Probabilistic Data Association (JPDA) operation, and/or a Multiple Signal Classification (MUSIC) algorithm.

In some embodiments, processing includes locating the at least one signal-emitting tag and the visualization device by triangulation and/or trilateration.

In some embodiments, the physical location detection apparatus includes one or more of Synthetic Aperture Radar (SAR), stereo cameras, Time-of-Flight (ToF) cameras, structured light cameras, and/or LIDAR systems to generate the 3D map data.

In some embodiments, the drop point data includes geolocation data and/or data that indicates location based a fixed signal source detectable via the phased antenna array.

In some embodiments, combining the location data and the 3D map data includes calculating an offset between an origin of signal data received by the phased antenna array and an origin of the 3D map data.

In some embodiments, the method further includes identifying a current delivery, displaying markers for tagged packages within a visualization provided by the visualization device, displaying a marker for at least one drop point in the drop point data, and generating a path using the 3D map data to the at least one drop point in the visualization.

In some embodiments, the method further includes waiting for each of a plurality of tagged packages to be at the at least one drop point and displaying delivery completion indication when each of the plurality of tagged packages is delivered.

DETAILED DESCRIPTION

Embodiments of the present disclosure will be described more fully hereinafter with reference to the accompanying drawings in which like numerals represent like elements throughout the several figures and in which example embodiments are shown. Embodiments of the claims may, however, be embodied in many different forms and should not be construed as limited to the embodiments set forth herein. The examples set forth herein are non-limiting examples and are merely examples among other possible examples.

Figure 1:
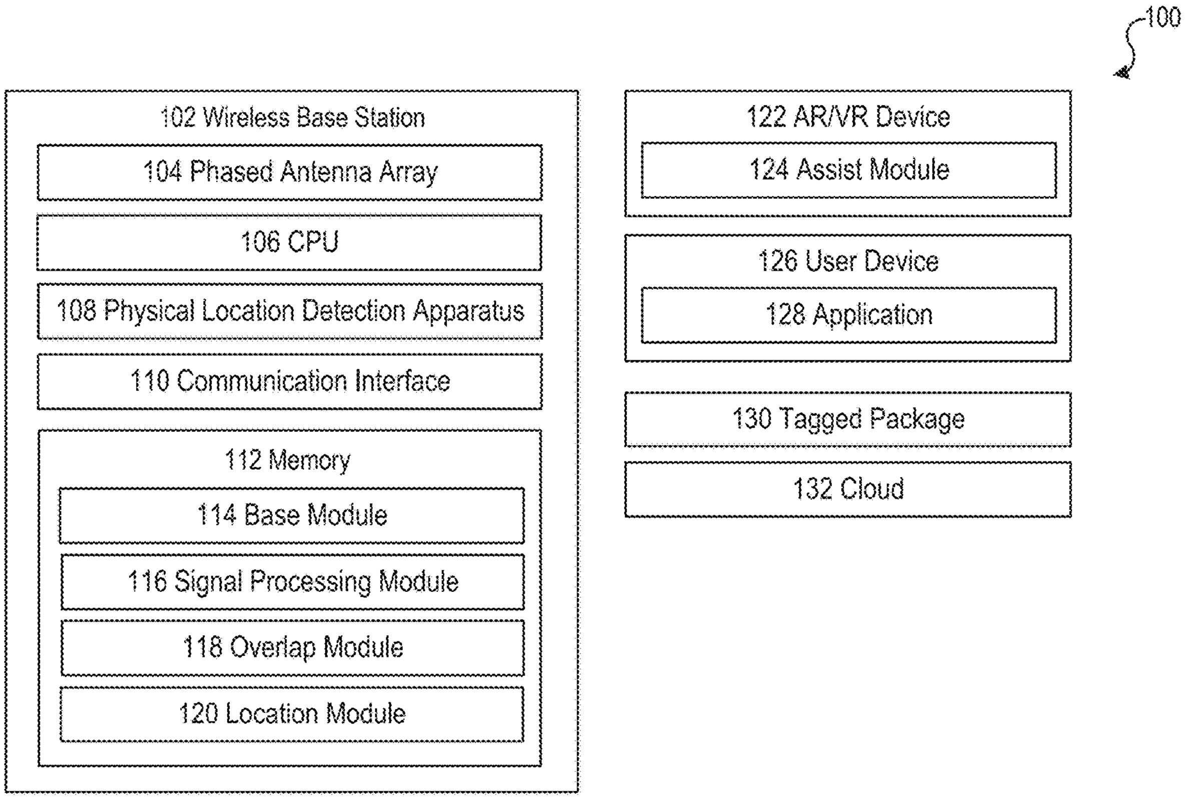
FIG. 1 is a schematic diagram of a phased array tracking system, according to an embodiment.

FIG. 1 is a schematic illustration of a phased array tracking system 100. The system 100 may include a wireless base station 102, which may track the location of one or more signal sources. The wireless base station 102 may also be a type of wireless router that allows for a Bluetooth, cellular, or other type of signal frequency connection or broadcast. In one embodiment, the wireless base station 102 may be for military grade synthetic aperture radar signals. The wireless base station 102 may include a phased antenna array 104 comprised of multiple individual antennas, each capable of transmitting and/or receiving electromagnetic signals. The wireless base station 102 receives signals from one or more sources using the phased antenna array 104 and triangulates the location of the source using an angle of arrival (AoA) calculation based on the difference in phase and time of the received signals. The wireless base station 102 may have active and passive functionality, which may be separate modes or may both function simultaneously. Passive functionality may refer to only receiving signals from sources, whereas active functionality may refer to transmitting to a device in order to elicit a response. Achieving centimeter-level accuracy in 3D mapping is helpful for applications that use precise positioning and spatial awareness. The system 100 is designed to provide this high level of precision, ensuring that positioning can be accurately determined within centimeter-level tolerances, or better, in 3D space.

To enhance the capabilities of 3D mapping, the data obtained from the wireless base station 102 can be integrated with various other 3D mapping technologies. For instance, synthetic aperture radar (SAR) can be utilized to offer additional spatial data, leveraging its ability to produce high-resolution images and detect changes over time. Incorporating camera-based systems can provide visual context and details that may not be captured by the phased antenna array alone. Ultrasound technology can also be employed, especially in environments where optical or radar-based systems might face challenges, such as underwater or in densely cluttered areas. Additionally, LIDAR technology can be integrated to measure distances by illuminating targets with laser light and measuring the reflection with a sensor, which is useful in applications like autonomous vehicles and topographic mapping. Combining these technologies allows for a more comprehensive 3D mapping process, enhancing accuracy and applicability across various fields. For example, in urban planning, combining phased array data with LIDAR can create detailed city models. In agriculture, integrating data from SAR and drones can help in precise crop monitoring and land use planning. In search and rescue operations, combining ultrasound with phased array data can assist in locating individuals in challenging environments. This approach ensures that the 3D mapping solution is effective in a wide range of scenarios, meeting the diverse needs of different industries and applications. The wireless base station 102 may be mounted to a delivery truck.

The system 100 may further include a phased antenna array 104, which may be an array of antennas that receive and/or transmit at different phases. This phased antenna array 104 may include any combination of receiver antennas, transmitter antennas, and antennas capable of both receiving and transmitting signals, thereby providing versatile communication capabilities. The phased antenna array 104 may include at least one antenna capable of transmission for the active functions of the wireless base station 102, such as beamforming, signal amplification, and directed communication. The phased antenna array 104 may also include at least two antennas capable of receiving for the triangulation functions of the wireless base station 102. These receiving antennas facilitate precise location determination of signal sources through techniques such as angle of arrival (AoA) estimation. The antennas may be arranged in a specific geometric configuration, such as linear, circular, or planar arrays, and electronically connected such that their signal phases and amplitudes can be controlled. This electronic control enables the phased array to dynamically steer the beam direction, enhance signal strength, and reduce interference from unwanted sources. The phased antenna array 104 may incorporate signal processing algorithms to optimize its performance. These algorithms may include adaptive beamforming, which adjusts the phase and amplitude of each antenna element to maximize signal reception from desired directions while minimizing noise and interference. The phased antenna array 104 may also support multiple-input multiple-output (MIMO) technology, allowing simultaneous transmission and reception of multiple data streams, thereby increasing the overall data throughput and reliability of the system 100. The phased antenna array 104 may be integrated with a control unit that monitors and adjusts the operational parameters of each antenna element in real-time. This control unit may utilize feedback mechanisms to dynamically adapt to changing environmental conditions and signal propagation characteristics, ensuring optimal performance under various scenarios. The integration of these features within the phased antenna array 104 enhances the system's capability to provide robust and efficient communication and precise triangulation of signal sources. The phased antenna array 104 may include a low noise amplifier (LNA) to amplify weak incoming signals from multiple antennas while minimizing noise. The LNA may include a number of channels which each correspond to a specific antenna in the phased array, enhancing sensitivity and accuracy. The phased antenna array 104 may be made from advanced materials, such as graphene or metamaterials, so as to deliver the increased sensitivity needed for certain applications.

In addition, or alternatively, the wireless base station 102 may use received signal strength to perform trilateration. Trilateration is an alternative method of determining the position of a signal source by calculating the distances between the source and multiple receiving antennas. Distance estimation can be performed using Angle of Arrival (AoA) data, where known positions of the antennas and the angles of the incoming signal are used to infer the distance. However, a more direct and sometimes more precise method may involve deriving the distance from the difference in signal strength received at two or more antennas. The principle behind this method is based on the inverse relationship between signal strength and distance. As the distance from the signal source to the antenna increases, the signal strength decreases, typically following an inverse-square law or a similar attenuation model depending on the environment. In scenarios where trilateration is implemented, the wireless base station 102 may use at least three antennas to determine the exact location of the signal source. The use of three antennas allows the formation of three independent distance equations, which, when solved simultaneously, may provide a unique intersection point corresponding to the location of the signal source. The received signal strength at each antenna may provide the basis for calculating the respective distances. For example, if the signal at one antenna is stronger by a known percentage compared to another, the ratio of these signal strengths can be used to infer the ratio of the distances. By combining this information with the known physical separation between the antennas, the system 100 can establish a set of nonlinear equations representing the distances from the source to each antenna. The solution involves finding the point where the calculated distances (based on signal strength differences) intersect, which represents the most likely location of the signal source relative to the antenna array. Furthermore, the accuracy of trilateration can be enhanced by incorporating additional antennas, which provide more distance measurements and, consequently, reduce the uncertainty in the position estimate. The use of more antennas allows for the implementation of overdetermined systems, where the additional data can be used to minimize errors and improve the robustness of the location estimation process. Trilateration is particularly advantageous in environments where the AoA measurement might be challenging due to multipath propagation or other interference effects that distort the apparent AoA. Trilateration may be used in place of or in conjunction with triangulation.

In some embodiments, the wireless base station 102 uses a MUSIC (Multiple Signal Classification) algorithm. MUSIC utilizes the eigenvalues and eigenvectors of the covariance matrix of the received signal to estimate AoA with high resolution by searching for peaks in the spatial spectrum. To address complex environments, a Multiple Signal Classification (MUSIC) algorithm can be used. In signal processing problems, the objective is to estimate from past measurements or expectations of measurements from a set of constant values upon which the received signals depend.

The system 100 may further include a computer processing unit (CPU) 106, which may be configured to decode and execute any instructions received from one or more other electronic devices or server(s). The CPU 106 may include one or more general-purpose processors (e.g., INTEL® or Advanced Micro Devices® (AMD) microprocessors) and/or one or more special purpose processors (e.g., digital signal processors or Xilinx® System On Chip (SOC) Field Programmable Gate Array (FPGA) processor). The CPU 106 may be configured to execute one or more computer-readable program instructions, such as program instructions, to carry out any of the functions described in this description. The CPU 106 may be a GPU such as those produced by Nvidia®

The system 100 may further include a physical location detection apparatus 108, which may include Synthetic Aperture Radar (SAR), cameras, or other sensors to accurately map the environment in 3D. Synthetic Aperture Radar (SAR) employs radar signal transmission and reception to generate high-resolution images of the environment. SAR transmits radar pulses towards the target area and captures the reflected signals. By analyzing the time delay and phase shifts of these signals, the distance to various points in the environment is calculated. SAR synthesizes a larger aperture by moving the radar sensor over a distance, such as on a satellite, aircraft, or drone, thereby enhancing resolution and detail beyond the capabilities of a physical antenna of the same size. Techniques such as Interferometric SAR (InSAR) and Tomographic SAR (TomoSAR) further enhance the system's ability to map 3D space. InSAR involves capturing multiple SAR images from slightly different positions and analyzing phase differences to extract precise elevation data, creating detailed 3D terrain models. TomoSAR uses multiple SAR images from various angles to reconstruct the 3D structure of complex targets, such as urban environments, similar to medical tomography. The system 100 may also utilize various types of cameras equipped with depth-sensing capabilities to map 3D space. These include stereo cameras, Time-of-Flight (ToF) cameras, structured light cameras, and LIDAR systems. The integration of SAR and camera data enhances the system's ability to produce detailed and accurate 3D maps. The data fusion process combines the strengths of both technologies: SAR provides precise distance measurements and the ability to penetrate obstructions like foliage or clouds, while cameras offer high-resolution texture and detail. This combination allows the system 100 to create multi-resolution models, with SAR providing large-scale topographic mapping and cameras offering detailed local 3D reconstruction. Additionally, cross-validation techniques may be employed to refine and validate the 3D models by cross-referencing data from SAR and cameras, improving overall accuracy and reducing errors. This holistic approach ensures that the physical location detection apparatus 108 can deliver comprehensive and precise 3D environmental mapping suitable for a wide range of applications, from urban planning and environmental monitoring to virtual and augmented reality experiences.

The system 100 may further include a communication interface 110, which may be a set of hardware and/or software components that facilitate the exchange of data between different systems, devices, or components. The communication interface 110 serves as the conduit through which data is transmitted, received, and interpreted, ensuring seamless communication between the wireless base station 102 and an augmented reality (AR) and/or virtual reality (VR) device, such as an AR/VR headset and/or a mobile device (e.g., tablet or cell phone).

The system 100 may further include memory 112, which may include, but is not limited to, fixed (hard) drives, magnetic tape, floppy diskettes, optical disks, Compact Disc Read-Only Memories (CD-ROMs), and magneto-optical disks, semiconductor memories, such as ROMs, Random Access Memories (RAMs), Programmable Read-Only Memories (PROMs), Erasable PROMs (EPROMs), Electrically Erasable PROMs (EEPROMs), flash memory, magnetic or optical cards, or another type of media/machine-readable medium suitable for storing electronic instructions. The memory may include modules implemented as a program.

The system 100 may further include a base module 114, which may collect drop point data from the cloud 132. The base module 114 may then collect signal data from the phased antenna array 104. The base module 114 may initiate the signal processing module 116 to process the collected signal data. Then, the base module 114 may collect the 3D map data from the physical location detection apparatus 108. The base module 114 may initiate the overlap module 118 to combine the processed signal data and 3D map data. The base module 114 may initiate the location module 120 to add the drop point data to the combined map data and to transform the data such that an augmented reality (AR) and/or virtual reality (VR) device 122 (also referred to herein as a "visualization device") is at the origin. In some embodiments, the AR/VR device can be an AR/VR headset and/or a mobile device (e.g., tablet or cell phone).

The system 100 may further include a signal processing module 116, which may process the signals received by the phased antenna array 104 in order to locate the source of the signal in 3-dimensional space. The signal processing module 116 may utilize sophisticated computational techniques such as Kalman filters and joint probabilistic data association to accurately estimate device locations and track their movements while maintaining synchronization among multiple antennas for precise triangulation. The signal processing module 116 may utilize a subnanosecond clock and a high-speed power meter for detecting the small differences in time between receiving a signal at two or more receiver antennas.

The system 100 may further include an overlap module 118, which may overlap the phased antenna array data with physical location data. This creates a comprehensive map of where all physical objects and tagged packages are in 3D space.

The system 100 may further include a location module 120, which may compute the tagged package 130 drop point location relative to the AR/VR device 122. Once the drop point location is calculated relative to the wireless base station 102, the point-of-origin vectors can be transformed for the AR/VR device 122 so that the delivery person can see an AR/VR marker for the drop point at the correct location.

The system 100 may further include one or more augmented reality (AR) or virtual reality (VR) devices 122, which may be devices capable of displaying digital information in the real-world environment. The AR/VR device 122 may include a display system, a sensor suite, a processing unit, and an interaction interface. The display system, which may include transparent or semi-transparent screens, head-mounted displays, or projection systems, may be designed to present visual data in conjunction with the user's natural surroundings. The sensor suite, which may consist of cameras, gyroscopes, accelerometers, and depth sensors, may be engineered to capture real-time environmental data and user interactions. The processing unit, which may encompass one or more microprocessors, graphics processing units (GPUs), and memory modules, may be configured to process the captured data, execute AR applications, and generate the digital overlays. The interaction interface, which may include touch sensors, voice recognition systems, or gesture recognition mechanisms, may be designed to facilitate user interaction with the augmented content. The AR/VR device 122 may be operable in various modes, such as object recognition, spatial mapping, and contextual information display, thereby providing an enriched user experience by integrating virtual elements with the physical world in a seamless manner. The AR/VR device 122 may further include communication modules to interface with external networks and devices, enhancing its functionality and applicability across multiple domains such as gaming, education, medical applications, and industrial operations. In some embodiments, the AR/VR device 122 may be a fully virtual reality (VR) device wherein everything displayed to the user is digital.

The system 100 may further include an assist module 124, which may assist the delivery person in finding the drop point and/or tagged packages. AR/VR markers may be used to visually indicate which tagged packages to deliver, the area of the drop point, and/or a pathway to the drop point.

The system 100 may further include a user device 126, such as a laptop, smartphone, tablet, computer, or smart speaker. The AR/VR device 122 may have the functionality of the user device 126 and any AR capable user device 126 may be the AR/VR device 122.

The system 100 may further include an application 128, which may allow the user to manage drop points and packages. Users may be able to set a drop point, find a drop point, manage multiple package deliveries, define a drop point, and manage security settings. The user may refer to the tagged package 130 delivery person, recipient, or both.

The system 100 may further include a tagged package 130, which may be a deliverable package with a signal-emitting tag. Signal-emitting tags include RFID tags, NFC tags, Wi-Fi tags, GPS tags, LoRa tags, or any other signal emitting device known in the art.

The system 100 may further include a cloud 132 or communication network, which may be a wired and/or wireless network. The communication network, if wireless, may be implemented using communication techniques such as Visible Light Communication (VLC), Worldwide Interoperability for Microwave Access (WiMAX), Long Term Evolution (LTE), Wireless Local Area Network (WLAN), Infrared (IR) communication, Public Switched Telephone Network (PSTN), Radio waves, and other communication techniques known in the art. The communication network may allow ubiquitous access to shared pools of configurable system resources and higher-level services that can be rapidly provisioned with minimal management effort, often over the Internet and relies on the sharing of resources to achieve coherence and economies of scale, like a public utility. At the same time, third-party clouds enable organizations to focus on their core businesses instead of expending resources on computer infrastructure and maintenance.

Figure 2:
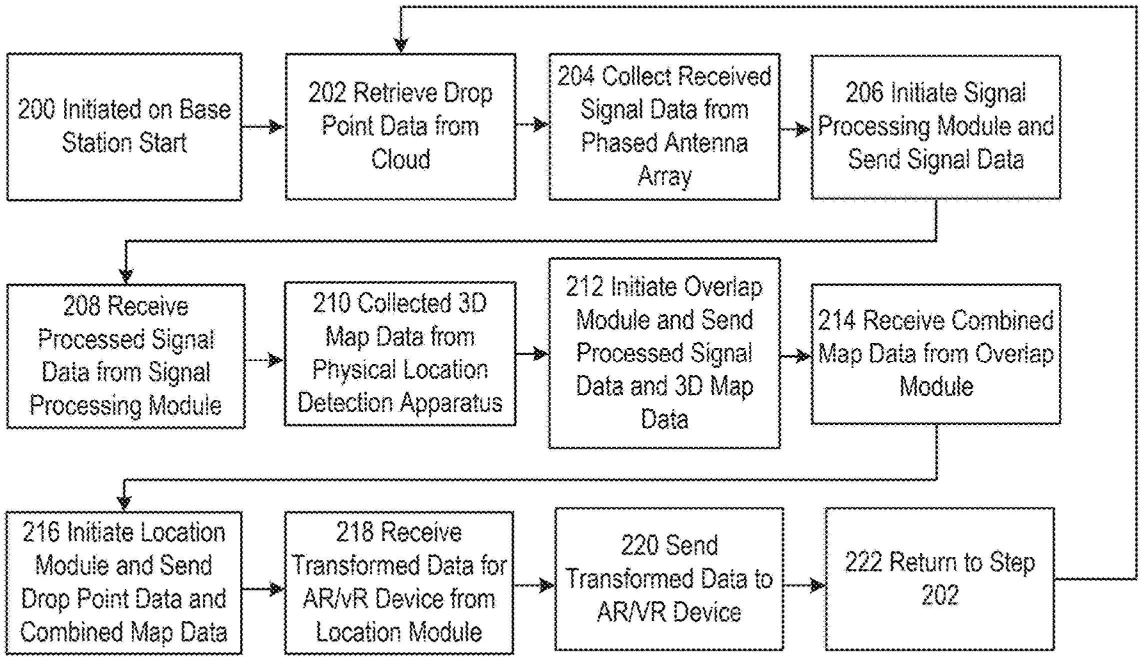
FIG. 2 is a flow chart of a method performed by a Base Module, according to an embodiment.

FIG. 2 illustrates an example operation of the base module 114. The base module 114 may be initiated at step 200 when the wireless base station 102 is powered on and/or activated. The base module 114 may retrieve at step 202 drop point data from the cloud 132. This data indicates the locations of drop points. This may be geolocation data or data that indicates location based on some fixed signal source that the wireless base station 102 can detect. The drop point may also have some visual indicator that could be detected by the physical location detection apparatus 108. The base module 114 may collect at step 204 received signal data from the phased antenna array 104. Signal data may be data on signals received from one or more sources, such as an AR/VR device 122, tagged packages 130, or any other non-AR/VR device. Signal data may include the waveform of the signal, the time received, the intensity of the signal, the phase of the signal, or any other property of the signal. Each antenna of the phased antenna array 104 may provide unique signal data. The base module 114 may initiate at step 206 the signal processing module 116 and send in the signal data. The signal processing module 116 may process the signals received by the phased antenna array 104 in order to locate the source of the signal in 3-dimensional space. The signal processing module 116 may utilize sophisticated computational techniques such as Kalman filters and joint probabilistic data association to accurately estimate device locations and track their movements while maintaining synchronization among multiple antennas for precise triangulation. The signal processing module 116 may utilize a subnanosecond clock and a high-speed power meter for detecting the small differences in time between receiving a signal at two or more receiver antennas. The base module 114 may receive at step 208 processed signal data from the signal processing module 116. The signal data may include tracking data. This tracking data may include the calculated location of each signal source based on received signals. The data may also include meta data such as confidence level and margin of error. For example, the tracking data may include that an AR/VR device 122 is at the coordinates (1348 cm, 804 cm, −52 cm) and a tagged package 130 is at the coordinates (1145 m, 210 cm, −30 cm) where the origin (0,0,0) is the location of the wireless base station 102. The base module 114 may collect at step 210 3D map data from the physical location detection apparatus 108. The base module 114 may initiate at step 212 the overlap module 118 and send the processed signal data and 3D map data. The overlap module 118 may overlap the processed signal data from the phased antenna array 104 with the 3D map data from the physical location detection apparatus 108. This creates a comprehensive map of where all physical objects and tagged packages are in 3D space. The base module 114 may receive at step 214 the combined map data from the overlap module 118. This map data contains the locations of all signal sources detected by the phased antenna array 104 overlayed over the 3D map of physical space detected by the physical location detection apparatus 108. The base module 114 may initiate at step 216 the location module 120 and send in the drop point data and combined map data. The location module 120 may compute the tagged package 130 drop point location relative to the AR/VR device 122. Once the drop point location is calculated relative to the wireless base station 102, the point-of-origin vectors can be transformed for the AR/VR device 122, so that the delivery person can see an AR/VR marker for the drop point at the correct location. The base module 114 may receive at step 218 a transformed version of the drop point data and tracking data such that the AR/VR device 122 is centered. The base module 114 may send at step 220 the transformed data to the AR/VR device 122. The base module 114 may return at step 222 to step 202. The base module 114 may continue to loop until the wireless base station 102 is deactivated and/or powered down. In some loops steps may be skipped to avoid redundancy, power consumption, and/or high computational load. The base module 114 may return at step 222 to step 202. The base module 114 may continue to loop until the wireless base station 102 is deactivated and/or powered down. In some loops steps may be skipped to avoid redundancy, power consumption, and/or high computational load.

Figure 3:
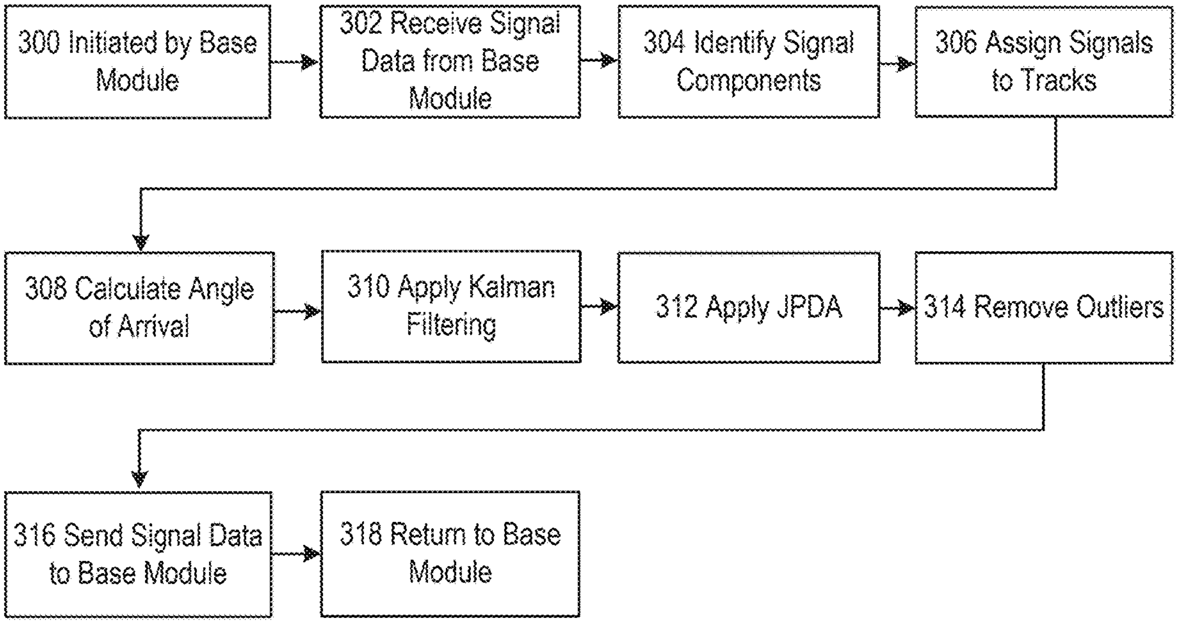
FIG. 3 is a flow chart of a method performed by a Signal Processing Module, according to an embodiment.

FIG. 3 illustrates an example operation of the signal processing module 116. The signal processing module 116 may be initiated at step 300 by the base module 114. The signal processing module 116 may receive at step 302 signal data from the base module 114. The signal processing module 116 may identify at step 304 the components of the received signals. Identifying the components of a signal, such as a Wi-Fi signal, may involve various techniques and tools. The signal processing module 116 may perform a frequency domain analysis using a Fast Fourier Transform (FFT). This converts the time-domain signal into its frequency components, allowing it to identify the carrier frequencies and any subcarriers. Tools like spectrum analyzers or SDR software can facilitate this process. The signal processing module 116 may determine the modulation scheme used. Wi-Fi signals typically use Orthogonal Frequency Division Multiplexing (OFDM). Analyzing the signal's modulation involves examining the changes in amplitude, frequency, or phase that encode the data. This can be done using constellation diagrams and demodulation algorithms. The signal processing module 116 may decode the higher-level protocol information. Wi-Fi signals conform to standards such as IEEE 802.11. Protocol analyzers or Wi-Fi sniffers can be used to interpret the protocol layers, extracting information such as MAC addresses, frame types, and payload data. Note that decryption of the data may not be needed for the data components to be identified. Cellular signals conform to standards such as LTE, GSM, and 5G. Protocol analyzers or cellular sniffers can be used to interpret the protocol layers, extracting information such as IMSI (International Mobile Subscriber Identity), cell tower identifiers, and data payload. Bluetooth signals typically use Gaussian Frequency Shift Keying (GFSK) and other modulation schemes like Phase Shift Keying (PSK) for enhanced data rates. Bluetooth signals conform to standards such as Bluetooth Core Specification. Protocol analyzers or Bluetooth sniffers can be used to interpret the protocol layers, extracting information such as device addresses, service records, and data payload. Note that decryption of the data may not be needed for the data components to be identified. Some signals, such as military signals, may have their components identified if the modulation methods and protocols are known by the system. These signals may be omitted from the public signal data. The signal processing module 116 may assign at step 306 the signals to tracks, associating new signals with existing tracks or creating new tracks. This involves analyzing the signal data and determining which signals correspond to which tracked signal source. The signal processing module 116 may use criteria such as signal strength, frequency, phase, identifying data, and timing information to match signals to known tracks. If a signal does not match any existing track, a new track is created. This step is useful for organizing the signal data into coherent tracks that can be further analyzed and monitored. The signal processing module 116 may calculate at step 308 the angle of arrival (AoA) for each signal using phase and time delay data. This involves determining the direction from which each signal is arriving relative to the phased array. The signal processing module 116 may use the phase differences and time delays between the signals received at different antennas to calculate the AoA. This step is helpful for understanding the spatial orientation of the signal sources and is a component in triangulating their positions. For example, the signal data indicates that a 2.4 GHz signal was received at antennas 1 and 2 of the phased antenna array 104. The signal was received 3 nanoseconds later at antenna 2 and the phase was shifted by 1 radian. Assume the antennas are 10 cm apart. The path difference (Δd) can be calculated using the time delay using the equation $\Delta d = c \times \Delta t$, where c is the speed of light in air. For a Δt value of 3 nanoseconds, the path difference is 9 cm. The sine function of the AoA is equal to the path difference, over the antenna separation, $\sin(AoA) = \Delta d/d$. This evaluating this for a path distance of 9 cm gives an AoA of approximately 1.12 radians. For another example, the signal data indicates that a 2.4 GHz signal was received by antennas 3 and 4 of the phased antenna array 104. The signal was received 2 nanoseconds later at antenna 4 and the phase was shifted by 1 radian. Assume the antennas are 10 cm apart. The phase difference (Δ)d can be converted to path difference (Δ·) using, $\Delta d = (\Delta\phi\lambda)/2\pi$. Where λ is wavelength. Wavelength can be calculated from $(\lambda) = c/f$, where c is the speed of light and f is frequency. Since frequency is 2.4 GHz, wavelength is 12.5 cm. Plugging in the wavelength and phase difference gives a path difference of about 2 cm. The sine function of the AoA is equal to the path difference, over the antenna separation, $\sin(AoA) = \Delta d/d$. This evaluating this for a path distance of 2 cm gives an AoA of approximately 0.20 radians. Using multiple methods of calculating the AoA allows the signal processing module 116 to check if all methods agree, and if not, to pick the most reliable method or approximate a value based on the answers of each method. The signal processing module 116 may apply at step 310 Kalman filtering to predict and update the state of tracked objects. The Kalman filter uses a series of measurements observed over time, containing statistical noise and other inaccuracies, to produce estimates of unknown variables. It operates in a two-step process: prediction and update. During the prediction step, the Kalman filter uses the current state estimate to predict the state at the next time step. During the update step, the filter incorporates new measurements to correct the state estimate. This process helps to smooth out the tracking data and provides more accurate estimates of the positions and velocities of tracked objects. The signal processing module 116 may apply at step 312 Joint Probabilistic Data Association (JPDA) to associate measurements with tracks probabilistically. JPDA is used in scenarios where there are multiple potential targets and measurements, and it is not clear which measurement corresponds to which target. The signal processing module 116 may calculate the probabilities of each measurement being associated with each track and updates the tracks based on these probabilities. This method helps to resolve ambiguities and improves the accuracy of tracking in complex environments with multiple signal sources. The signal processing module 116 may remove at step 314 outliers to ensure the accuracy of the tracking data. Outliers are measurements that deviate significantly from the expected values and can distort the tracking results. The signal processing module 116 may use statistical analysis and predefined thresholds to identify and filter out these erroneous data points. By removing outliers, the system improves the reliability and precision of the tracking data, ensuring that accurate and consistent measurements are used in the final tracking calculations. The signal processing module 116 may send at step 316 the finalized signal data to the base module 114. The signal data may include tracking data. This tracking data may include the calculated location of each signal source based on received signals. The data may also include meta data such as confidence level and margin of error. For example, the tracking data may include that an AR/VR device 122 is at the coordinates (1348 cm, 804 cm, −52 cm) and a tagged package 130 is at the coordinates (1145 m, 210 cm, −30 cm) where the origin (0,0,0) is the location of the wireless base station 102. The signal processing module 116 may return at step 318 to the base module 114.

Figure 4:
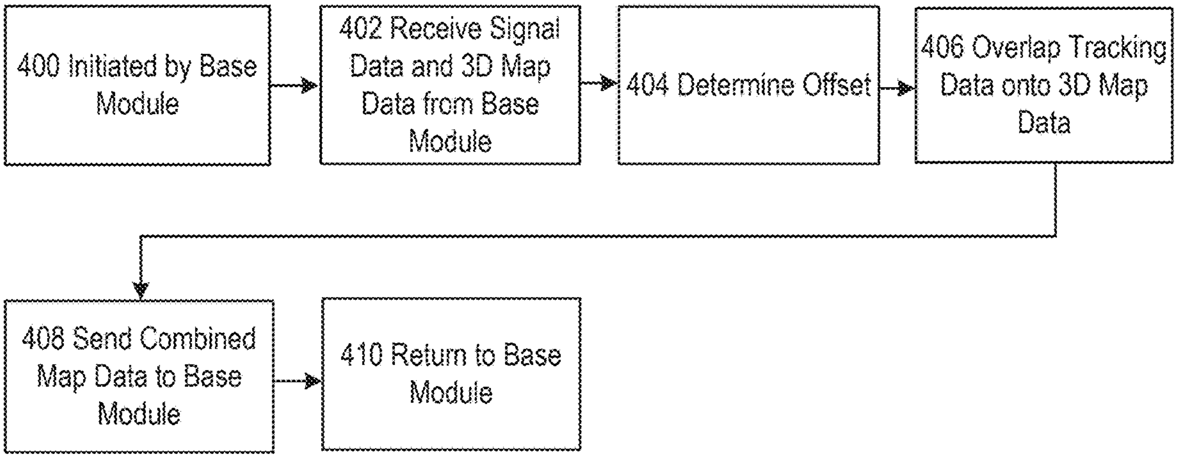
FIG. 4 is a flow chart of a method performed by an Overlap Module, according to an embodiment.

FIG. 4 illustrates an example operation of the overlap module 118. The overlap module 118 may be initiated at step 400 by the base module 114. The overlap module 118 may receive at step 402 signal data and 3D map data from the base module 114. The overlap module 118 may determine at step 404 the offset between the origin of the signal data and the origin of the 3D map data. This may correspond to the distance offset between the phased antenna array 104 and the physical location detection apparatus 108. If these components are fixed, then the offset may already be known to the system. If the physical location detection apparatus 108 emits a wireless signal, then the offset can be determined from the tracking data in the signal data. The overlap module 118 may overlap at step 406 the tracking data from the signal data onto the 3D map data. This creates a combined map where the signal sources in the tracking data are placed in their approximate locations in the 3D map. The overlap module 118 may send at step 408 the combined map data to the base module 114. The overlap module 118 may return at step 410 to the base module 114.

Figure 5:
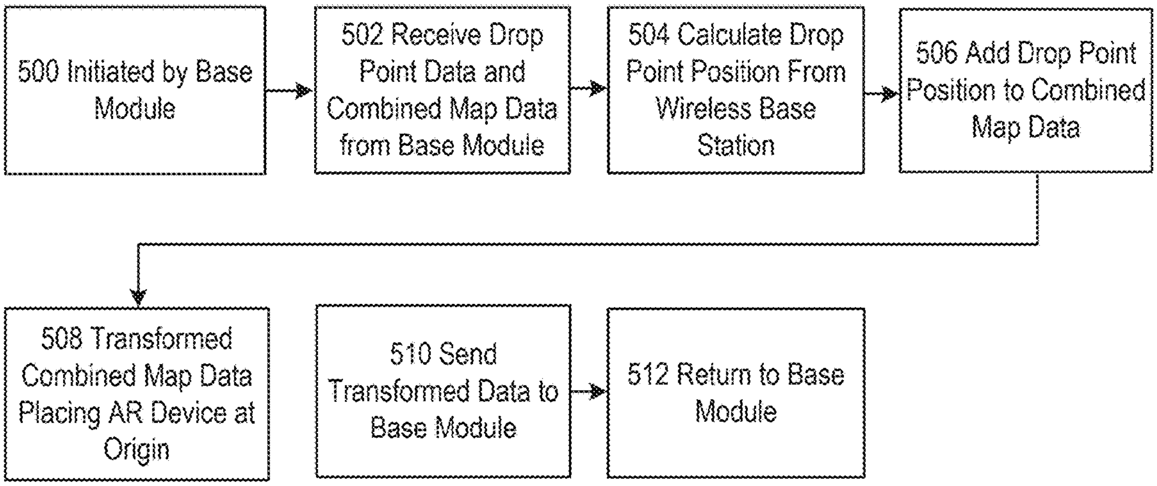
FIG. 5 is a flow chart of a method performed by a Location Module, according to an embodiment.

FIG. 5 illustrates an example operation of the location module 120. The location module 120 may be initiated at step 500 by the base module 114. The location module 120 may receive at step 502 drop point data and combined map data from the base module 114. The location module 120 may calculate at step 504 the drop point position relative to the wireless base station 102. The method of calculating this position may vary depending on the form of the drop point position. For example, in the simplest case the drop point has a signal generating tag that can be detected by the phased antenna array 104. Then the position of the drop point is already available in the tracking data from the signal processing module 116. For another example, if the drop point position is a geolocation, then the location module 120 may need to determine the geolocation of the wireless base station 102. This may be done directly if the wireless base station 102 includes a geolocator but may use the wireless base station 102 to detect a device with geolocator, such as a cellphone, receive geolocation data from the cellphone, and subtract the difference in position between the wireless base station 102 and the cellphone. For another example, the drop point data may indicate that the drop point is a fixed position from another signal source, such as the package recipient's home router. The location module 120 may use the tracking data for the home router, then offset that position by a fixed vector to locate the drop point position. For another example, the drop point may have a visual indicator, such as striped tape, which may be detected by the physical location detection apparatus 108. In which case the location module 120 may use the 3D map data in the combined map data to determine the position of the drop point. The location module 120 may add at step 506 the drop point position to the combined map data. If the drop point position was already in the tracking data, this step may be skipped. The location module 120 may transform at step 508 the combined map data such that the AR/VR device 122 is at the origin of the coordinates instead of the wireless base station 102. For example, the original tracking data included that the AR/VR device 122 is at the coordinates (1348 cm, 804 cm, −52 cm) and the tagged package 130 is at the coordinates (1145 m, 210 cm, −30 cm) where the origin (0,0,0) is the location of the wireless base station 102. The transformed tracking data would have the AR/VR device 122 at the origin (0,0,0), the wireless base station 102 at (−1348 cm, −804 cm, 52 cm) and the tagged package 130 at (−203 cm, −594 cm, 22 cm). This transformation is a mathematical process, which often will involve subtracting the coordinates of the AR/VR device 122 from the coordinates of each signal source in the tracking data and the vector of each data point in the 3D map data. With the AR/VR device 122 placed at the origin, the AR/VR device 122 can use the combined map data to quickly determine the direction and distance to any tagged packages 130, any drop points, and the wireless base station 102. The location module 120 may send at step 510 the transformed data to the base module 114. The location module 120 may return at step 512 to the base module 114.

Figure 6:
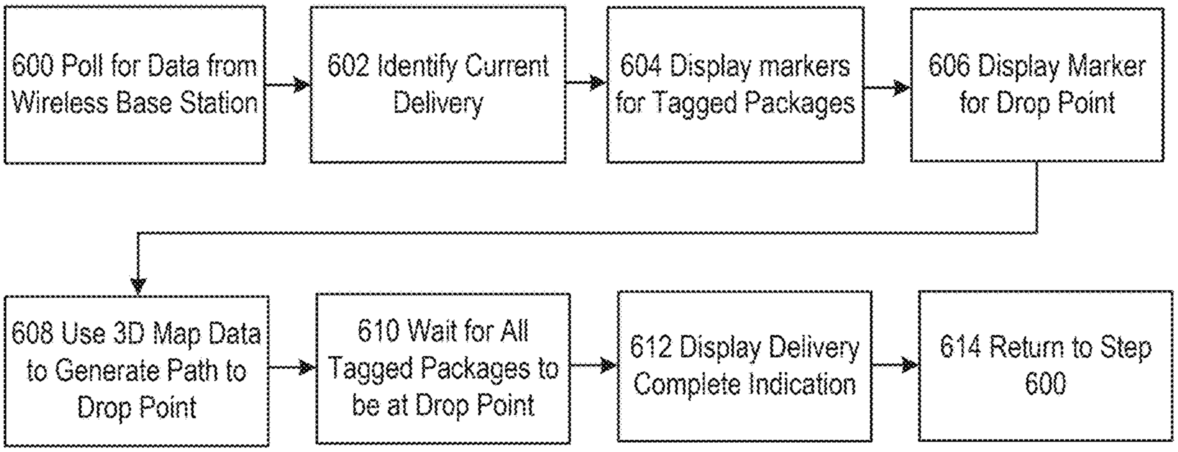
FIG. 6 is a flow chart of a method performed by an Assist Module, according to an embodiment.

FIG. 6 illustrates an example operation of the assist module 124. The assist module 124 may poll at step 600 for data from the wireless base station 102. This data may include combined map data that includes the positions of signal sources, drop points, and the environment relative to the AR/VR device 122. The assist module 124 may identify at step 602 the current delivery. This may be based on some pre-set delivery route or schedule. Alternatively, the assist module 124 may identify the closest drop point as the drop point for the current delivery. The assist module 124 may then filter the combined map data for tagged packages 130 and/or drop points that are specific to the current delivery. For example, when a delivery person looks into the back of their delivery truck, the AR/VR device 122 may only display markers for the tagged packages associated with the current delivery. This way the relevant packages can be easily located. The assist module 124 may display at step 604 AR/VR markers for tagged packages 130 associated with the current delivery. For example, a green arrow may appear directly above the tagged package 130. The assist module 124 may display at step 606 an AR/VR marker for the drop point associated with the current delivery. For example, a yellow arrow may appear above the drop point and a yellow box on the ground may indicate the boundaries of the drop point. The assist module 124 may generate at step 608 a path to the drop point from the location of the AR/VR device 122. This may use 3D map data to avoid obstacles and determine the most direct path. The generated path may then be displayed on the AR/VR device 122. For example, the delivery person may see a trail of yellow footprints on the ground leading to the drop point. The assist module 124 may wait at step 610 for all tagged packages 130 associated with the current delivery to be at the drop point for the current delivery. When all the tagged packages 130 associated with the current delivery are at the drop point for the current delivery, the assist module 124 may display at step 612 an indication that the delivery is complete. For example, the drop point AR/VR marker may turn from yellow to green and/or a message pop-up box may be displayed that reads "delivery complete". The assist module 124 may return at step 614 to step 600. This loop may continue until all scheduled deliveries are complete or until the AR/VR device 122 is deactivated.

The functions performed in the processes and methods may be implemented in differing order. Furthermore, the outlined steps and operations are only provided as examples, and some of the steps and operations may be optional, combined into fewer steps and operations, or expanded into additional steps and operations without detracting from the essence of the disclosed embodiments.

What is claimed is:

1. A system for augmented reality-based package tracking, the system comprising:

a communication interface that receives drop point data for a package;

a phased antenna array that receives signals from at least one signal-emitting tag associated with the package and a visualization device;

a signal processor that processes the received signals to generate location data for the at least one signal-emitting tag and the visualization device relative to the phased antenna array in three-dimensional (3D) space within an environment;

a physical location detection apparatus that generates 3D map data of the environment; and a processor that executes instructions stored in memory, wherein the processor executes the instructions to:

combine the location data and the 3D map data in accordance with an overlap module; and calculate drop point locations relative to the visualization device within the environment from the drop point data;

add the drop point locations to the combined location data and the 3D map data; and transform the combined location data, 3D map data, and drop point locations such that the visualization device is at an origin of a coordinate system in the 3D space;

wherein the communication interface further transmits the transformed combined tracking data, 3D map data, and drop point locations to the visualization device for real-time visualization and interaction therewith.

2. The system of claim 1, wherein the visualization device is at least one of an augmented reality (AR) device and a virtual reality (VR) device.

3. The system of claim 1, wherein the at least one signal-emitting tag include one or more of radio frequency identification (RFID) tags, near field communication (NFC) tags, Wi-Fi tags, global position system (GPS) tags, and long range (LoRa) tags.

4. The system of claim 1, wherein the signal processor generates the location data for the at least one signal-emitting tag and the visualization device using at least one of an Angle of Arrival (AoA) measurement, a Kalman filter, a Joint Probabilistic Data Association (JPDA) operation, and a Multiple Signal Classification (MUSIC) algorithm.

5. The system of claim 1, wherein the signal processor generates the location data for the at least one signal-emitting tag and the visualization device by triangulation or trilateration.

6. The system of claim 1, wherein the physical location detection apparatus includes one or more of Synthetic Aperture Radar (SAR), stereo cameras, Time-of-Flight (ToF) cameras, structured light cameras, and LIDAR systems the generate the 3D map data.

7. The system of claim 1, wherein the drop point data includes geolocation data or data that indicates location based on a fixed signal source detectable by the phased antenna array.

8. The system of claim 1, wherein the overlap module is executable by the processor to calculate an offset between an origin of signal data received by the phased antenna array and an origin of the 3D map data.

9. The system of claim 1, wherein the visualization device includes an assist module executable to:

identify that the package is part of a set of tagged packages associated with a current delivery;

display markers for the tagged packages within a visualization provided by the visualization device;

display a marker for at least one drop point in the drop point data; and use the 3D map data to generate a path to the at least one drop point in the visualization.

10. The system of claim 9, wherein the assist module is further executable to:

determine when each of the tagged packages is at the at least one drop point; and generate a display of a delivery completion indication when each of the tagged packages is determined to be at the at least one drop point.

11. A method for augmented reality-based package tracking the method comprising:

receiving drop point data for a package over a communication network;

receiving, via a phased antenna array, signals from at least one signal-emitting tag associated with the package and a visualization device;

processing the received signals via a signal processor to generate location data for the at least one signal-emitting tag and the visualization device relative to the phased antenna array in three-dimensional (3D) space within an environment;

generating 3D map data of the environment using a physical location detection apparatus;

combining the location data and the 3D map data;

calculating drop point locations relative to the visualization device within the environment from the drop point data;

adding the drop point locations to the combined location data and the 3D map data;

transforming the combined location data, 3D map data, and drop point locations such that the visualization device is at an origin of a coordinate system in the 3D space; and transmitting the transformed combined tracking data, 3D map data, and drop point locations to the visualization device for real-time visualization and interaction therewith.

12. The method of claim 11, wherein the visualization device is at least one of an augmented reality (AR) device and a virtual reality (VR) device.

13. The method of claim 11, wherein the at least one signal-emitting tag include one or more of radio frequency identification (RFID) tags, near field communication (NFC) tags, Wi-Fi tags, global position system (GPS) tags, and long range (LoRa) tags.

14. The method of claim 11, wherein generating the location data for the at least one signal-emitting tag and the visualization device includes using at least one of an Angle of Arrival (AoA) measurement, a Kalman filter, a Joint Probabilistic Data Association (JPDA) operation, and a Multiple Signal Classification (MUSIC) algorithm.

15. The method of claim 11, wherein generating the location data for the at least one signal-emitting tag and the visualization device includes using triangulation or trilateration.

16. The method of claim 11, wherein the physical location detection apparatus comprises one or more of Synthetic Aperture Radar (SAR), stereo cameras, Time-of-Flight (ToF) cameras, structured light cameras, and LIDAR systems to generate the 3D map data.

17. The method of claim 11, wherein the drop point data includes geolocation data or data that indicates location based on a fixed signal source detectable via the phased antenna array.

18. The method of claim 11, wherein combining the location data and the 3D map data includes calculating an offset between an origin of signal data received by the phased antenna array and an origin of the 3D map data.

19. The method of claim 11, further comprising:

identifying that the package is part of a set of tagged packages associated with a current delivery;

displaying markers for tagged packages within a visualization provided by the visualization device;

displaying a marker for at least one drop point in the drop point data; and generating a path using the 3D map data to the at least one drop point in the visualization.

20. The method of claim 19, further comprising:

determining when each of the tagged packages is at the at least one drop point; and generating a display of a delivery completion indication when each of the tagged packages is determined to be at the at least one drop point.

* * * * *